United States Patent
Smyth et al.

(10) Patent No.: US 6,347,224 B1
(45) Date of Patent: *Feb. 12, 2002

(54) CHARGING SYSTEMS FOR SERVICES IN COMMUNICATIONS

(75) Inventors: Peter P Smyth, Suffolk; Paul F McKee, Colchester; Katherine E Doyle, Suffolk, all of (GB)

(73) Assignee: British Telecommunications public limited company, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,616
(22) PCT Filed: Apr. 1, 1997
(86) PCT No.: PCT/GB97/00923
§ 371 Date: Mar. 5, 1998
§ 102(e) Date: Mar. 5, 1998
(87) PCT Pub. No.: WO97/37503
PCT Pub. Date: Oct. 9, 1997

(30) Foreign Application Priority Data

Mar. 29, 1996 (EP) .............................................. 96302237
Sep. 24, 1996 (GB) .............................................. 9619897

(51) Int. Cl.[7] ............................................. H04M 11/00
(52) U.S. Cl. ...................... 455/406; 455/422; 455/453; 379/113; 379/133
(58) Field of Search ................................ 455/406, 408, 455/453, 405, 407, 422; 379/113, 133, 111, 134, 137

(56) References Cited

U.S. PATENT DOCUMENTS

| | | | | |
|---|---|---|---|---|
| 5,241,686 A | * | 8/1993 | Charbonnier | 455/453 |
| 5,488,655 A | * | 1/1996 | Hamlen | 379/111 |
| 5,497,504 A | * | 3/1996 | Acampora et al. | 455/63 |
| 5,519,769 A | | 5/1996 | Weinberger et al. | |
| 5,758,288 A | * | 5/1998 | Dunn et al. | 455/406 |
| 5,774,802 A | * | 6/1998 | Tell et al. | 455/408 |
| 5,794,140 A | * | 8/1998 | Sawyer | 455/406 |
| 5,809,120 A | * | 9/1998 | Montgomery et al. | 379/134 |
| 5,848,139 A | * | 12/1998 | Grover | 379/134 |
| 5,898,915 A | * | 4/1999 | Reininghaus et al. | 455/408 |
| 5,949,862 A | * | 9/1999 | Fukuzawa et al. | 379/134 |
| 5,970,403 A | * | 10/1999 | Alperovich et al. | 455/408 |
| 5,974,308 A | * | 10/1999 | Vedel | 455/407 |
| 5,978,455 A | * | 11/1999 | Johnson et al. | 379/113 |
| 6,011,838 A | * | 1/2000 | Cox | 379/113 |
| 6,078,651 A | * | 6/2000 | Den Hartog | 379/113 |

FOREIGN PATENT DOCUMENTS

| | | | |
|---|---|---|---|
| EP | 0 526 118 | * | 2/1993 |
| GB | 2 272 607 A | * | 5/1994 |
| WO | WO 94 28683 | * | 12/1994 |
| WO | WO 95 30317 A | * | 11/1995 |

* cited by examiner

Primary Examiner—Doris H. To
(74) Attorney, Agent, or Firm—Nixon & Vanderhye P.C.

(57) ABSTRACT

In a charging system for cellular communications, real-time prices for new connections are offered to the customer. The real-time prices take into account both prevailing and historic traffic patterns, together with the probability that the customer will move from their current cell into a neighboring cell. Cells of the network are monitored in clusters. If a customer is located in one particular cell, the price offered to that customer will take into account the probability of handover to a neighboring cell during the connection, and may also take into account the probability of incoming traffic from neighboring cells during the connection. To enable this predictive pricing, the system stores, and may also update, historic data.

24 Claims, 9 Drawing Sheets

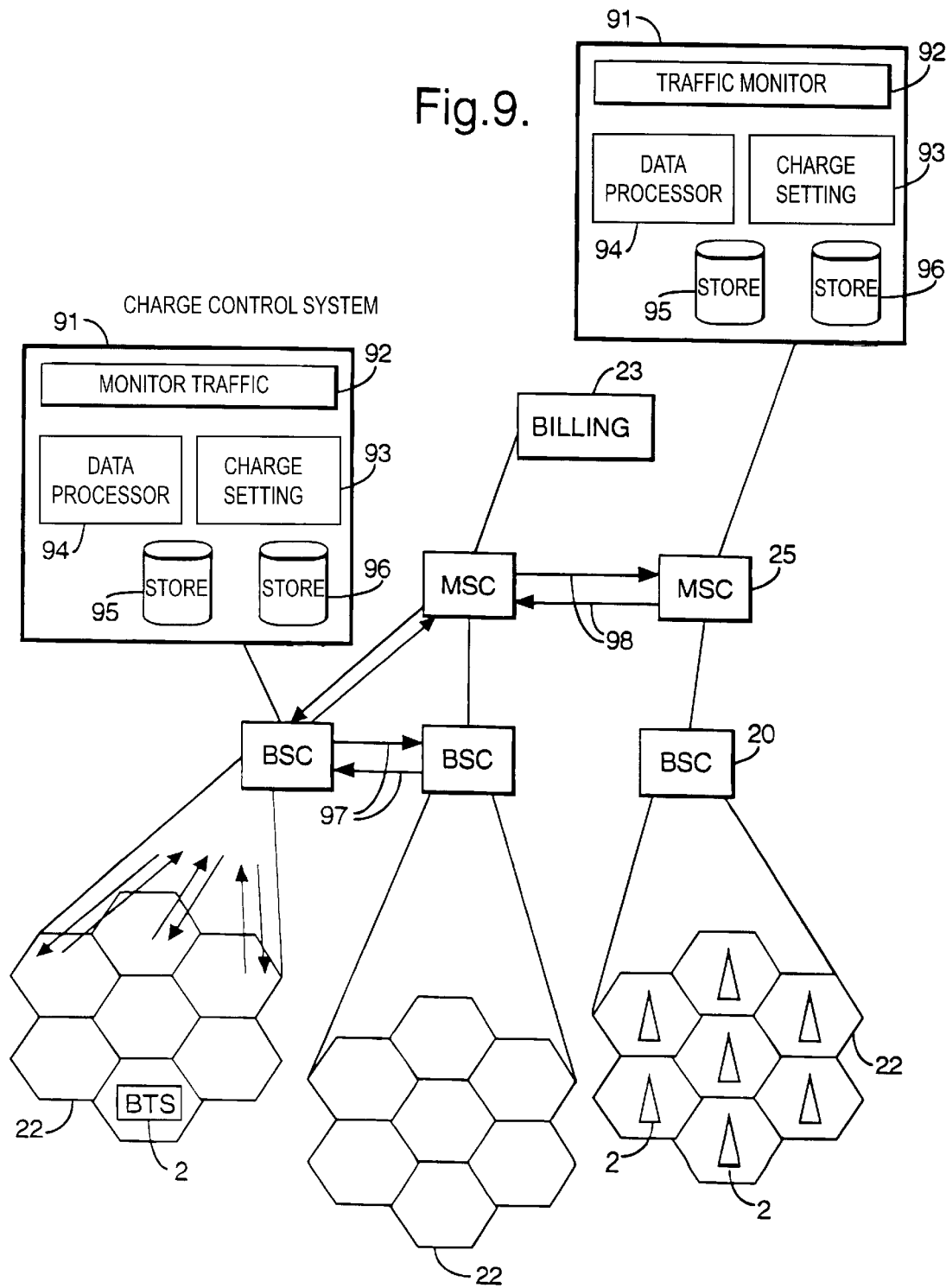

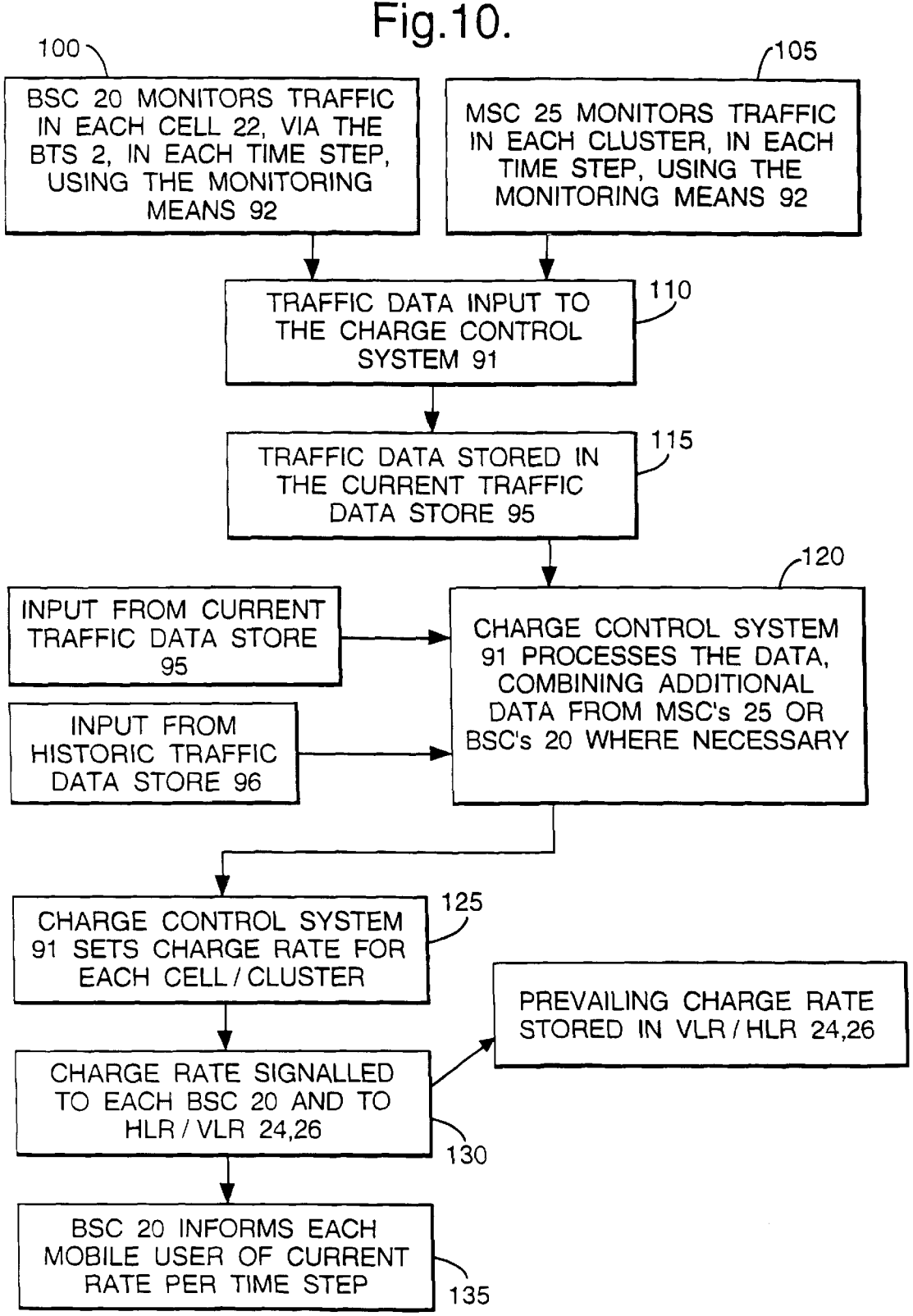

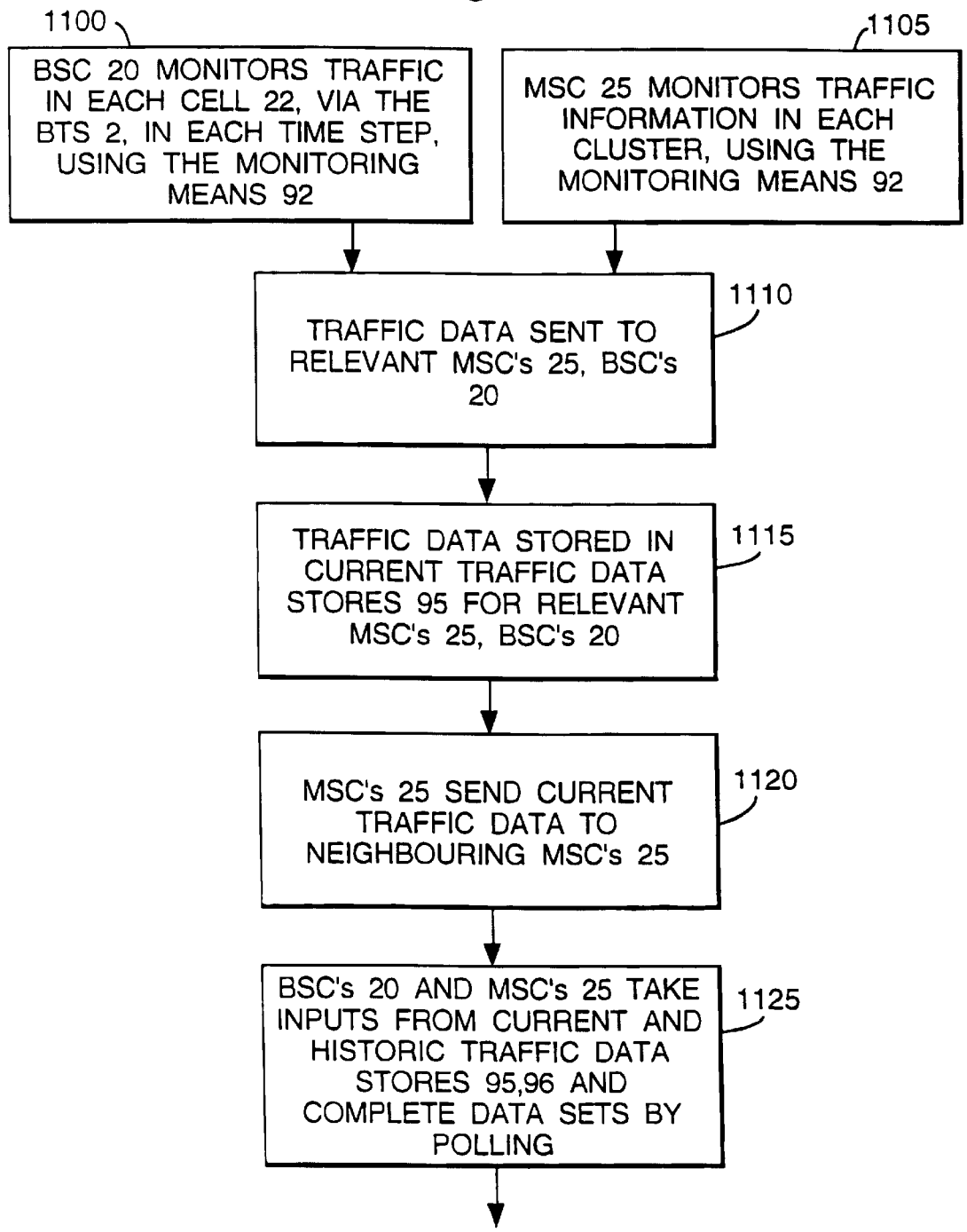

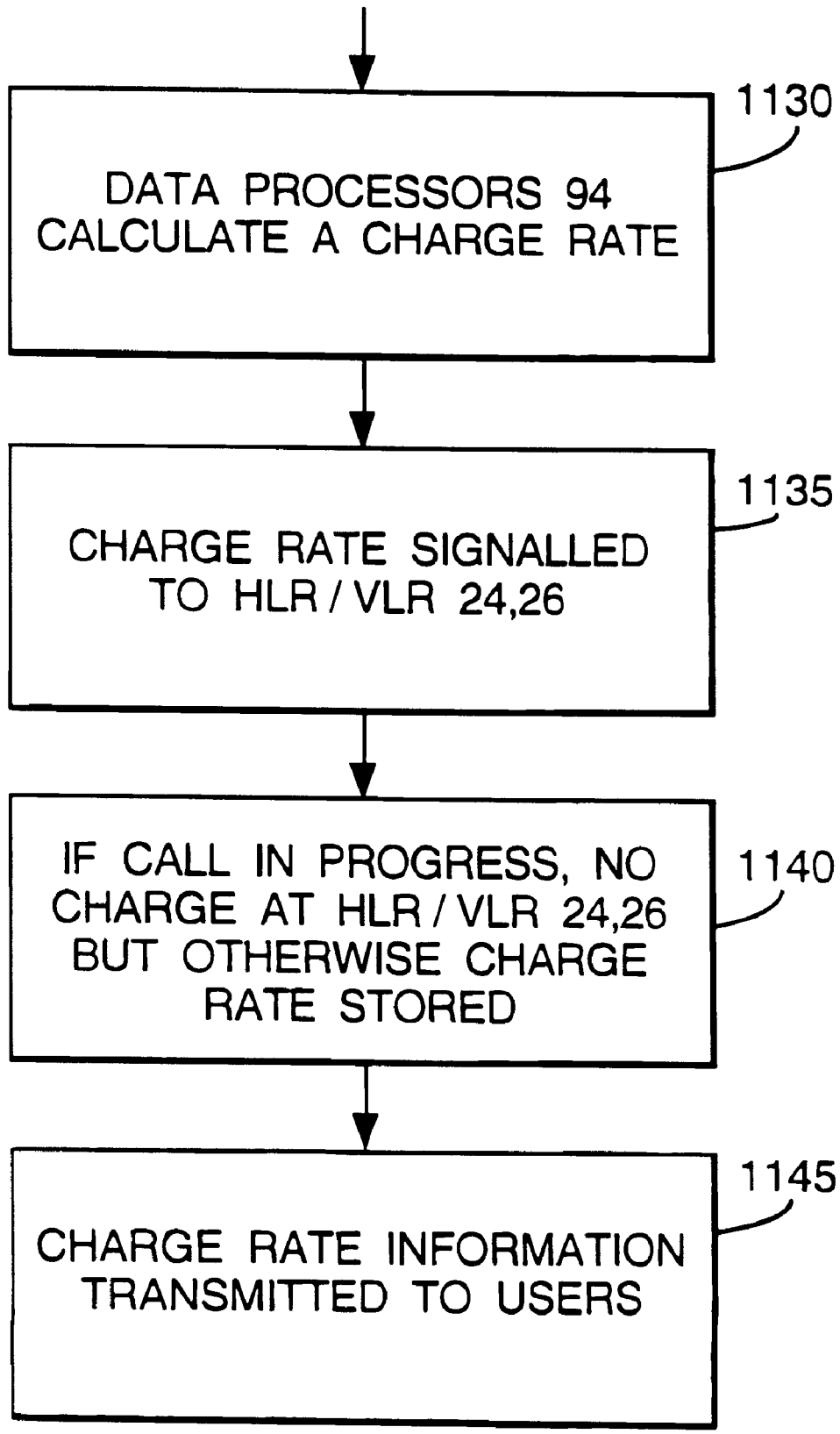

CHARGING SYSTEMS FOR SERVICES IN COMMUNICATIONS

BACKGROUND OF THE INVENTION

1. Field of the Invention

The present invention relates to charging systems for use in communications.

2. Related Art

A fundamental problem in providing a communications network infrastructure is the ratio of peak to mean demand. The network infrastructure has to be dimensioned to deal with peak demand. This means that resources are not profitably utilised when demand lies below its peak.

In cellular communications systems, or mobile communications systems, demand can pose a significant problem. The number of customers has increased extremely fast. In the UK, there were about one million customers in 1990. By 1996, there were over six million connections to mobile networks.

Cellular, or mobile, communications networks have become established over the decade between the mid-80s and the mid-90s. There are various types, including analogue and digital signalling versions. Technical information about such networks has been published for instance in "Mobile Radio Telephones in the UK" by Dr R. C. V. Macario, published in the UK by Glentop Press Ltd in 1988, in the British Telecom Technology Journal, Volume 8, No.1, January 1990, and in the British Telecom Technology Journal, Volume 14, No.3, July 1996. Two articles in the last quoted reference which may be particularly of interest are "Mobile Network Design and Optimisation" by Button, J et al, at pages 29 to 46, and "Global System for Mobile Communications—What's in Store?" by Holley, K A, at pages 47 to 54.

Referring to FIG. 1, a mobile network operator provides a set of signal transmitters 2 for communicating, usually by radio, with a mobile unit carried by the customer 10. The signal transmitters 2 are connected to switching units 3 of a land-based network, for instance the Public Switched Telecommunications Network (PSTN), on which the mobile network operator leases capacity. All long distance traffic is generally carried by the fixed network. It is primarily the customer access links, provided by the signal transmitters 2, which give the mobility.

The "cells" of a cellular network are generally created as follows. The mobile customer receives signals from the network from any of a plurality of signal transmitters. In known networks of this type, the customer receives signals from the transmitter providing the strongest signal. This is usually but not necessarily the nearest transmitter. The plurality of transmitters thereby effectively creates cells, the boundary of each cell being the point at which the cell's transmitter "hands over" to an adjoining transmitter because the signal of the adjoining transmitter becomes stronger at that point.

It is not essential that the signal transmitters are all at permanently fixed locations. For instance, it is possible to use a mobile transmitter, even another mobile phone, as a signal transmitter to a mobile phone. That is, as long as it is not in use as a telephone, one mobile phone can act as a mobile "repeater" for another mobile phone. In this way, one can install something to operate as a signal base station, even within a vehicle such as a bus.

In each cell, there will be several factors affecting availability of communications bandwidth to the user. These will include facilities provided, such as the capacity of available bearers, together with the traffic load already carried in a cell. Hence, in Britain the available capacity to users driving on the M25 motorway might be quite low, particularly at certain times of day, in spite of high capacity transmitters being available. Then in cells to either side of the M25 motorway, although the transmitters may have much lower bandwidth specifications, the available capacity might be relatively high because of the lower population of users in those adjacent cells.

It is possible to provide real-time pricing information to a user and a system for doing so in relation to a fixed network is set out in the specification of co-pending International patent application number WO94/28683. However as the user moves from cell to cell of a mobile network, the real-time pricing information can quickly become out of date and/or inappropriate.

SUMMARY OF THE INVENTION

According to a first aspect of the present invention, there is provided a charge control system for use in a cellular communications network infrastructure, wherein local charges are modifiable in response to current local traffic loading, the system comprising:

i) monitoring means for monitoring current local traffic loading in the network;

ii) a data store for storing historic traffic data related to cells of the network;

iii) data processing means for generating a local traffic-related parameter, dependent on the current traffic loading and the historic traffic data; and iv) charge setting means for setting the rate at which traffic is charged by the network in a local area thereof, the rate set by the charge setting means being controlled at least in part by said local traffic-related parameter.

Embodiments of the invention may find application in fixed networks having an area-based management infrastructure, which therefore could be described as cellular. However, they are probably of more immediate relevance to networks which are designed at least in part for use by mobile users, such as the cellular mobile network provided in the UK by Cellnet. In this case, the historic traffic data usefully includes or comprises handover data, relating to historic handover patterns between cells.

Because the charge-setting depends at least in part on historic traffic data, it is possible to introduce a learning behaviour in the way charges are set.

Charge setting may be actually carried out in more than one way. For instance, it might be done by setting a field in a call record, during call set-up, to show an applicable charge rate for the duration of the call. In the known Cellnet mobile network, information specific to a user is usually stored at the Visiting or Home Location Registers. Information about usage, which will be billed to a particular user, is collected there in the form of toll tickets. A particularly convenient way of collecting billing information in embodiments of the present information, so that the charge rate for a call is maintained throughout the duration of a call, including across cell boundaries, might be to set a field in the toll ticket, at call set-up, which indicates a charge band. That field need only be modifiable thereafter under extraordinary circumstances, or perhaps with the agreement of the user. A charge band may be one of, for instance, 100 contiguous charge bands to give sufficient flexibility in the pricing structure.

Traffic will be carried, and charged, in different ways. A purpose of being able to set the charge rate is to influence the use of finite resources in a network. Depending on the access technology used, the "finite resource" might be channel frequencies, available time slots or, in Code Division Multiple Access (CDMA), simply the number of users communicating in a common geographical area.

(It should be noted that although reference may be made herein to "calls", this should be taken to mean any connection using the network which can be expected to be billed. It therefore covers data transfer, telemetry and multimedia applications for instance, not necessarily involving voice.)

Embodiments of the invention will find particular relevance in cellular mobile networks.

Preferably, the charge control system further comprises reporting means to report current charge rate information to user equipment. For instance, it may broadcast current local charge rates to all user equipment which is switched on. However, that approach uses a relatively high level of capacity. A charge rate report might be triggered by a user input, such as a specific request or simply putting their equipment in the "off hook" condition, to transmit the report just to that user. A third and perhaps best alternative is that the reporting means sends charge rate reports to each user whose equipment is switched on, in turn, using perhaps an existing control channel or, in digital links, an allocated time slot of the connection channel. The charge rate report could include a string of charge rates, each relevant to a different type of communication that the user might be interested in, such as both single and multiple channel charge rates.

Current charge rate information can be used by the user in deciding whether or not to make a call.

Preferably also, the charge control system will further comprise means to peg a local charge rate for the duration of a connection established by a user. This may be done as mentioned above, during call set-up. The pegging is preferably maintained even if the user moves to a different cell. Alternatively, the system might notify any current users of impending charge rate changes. The users could then make a decision to terminate or postpone a connection. This alternative might only be used in unusual circumstances, such as heavy build of traffic in a cell during data download by a user, since it is likely to be preferred by the user that a connection can be continued at fixed rate, once started.

Systems built according to embodiments of the present invention can control local charge rates so as to take into account not only the resources available at a customer's current location, but also the resources available at one or more potential locations for that customer. Preferably, the data processing means, in generating a charge rate for a cell, calls up traffic loading data for that cell, and for its neighbours, and applies an algorithm which includes terms for traffic loading data at the customer's current location and at one or more potential locations for that customer.

The data processing means may call up handover data giving at least a relative probability of handover to each of the neighbouring cells and use these relative probabilities to weight the importance given to the traffic loading data for each of the neighbouring cells in generating a local charge rate.

Alternatively or additionally, systems according to embodiments of the present invention might take into account the current and future expected traffic loading in one cell, in the light of traffic which can be expected to be incoming to the cell, newly arising there, and perhaps also outgoing from the cell.

A suitable form of algorithm might be used to generate the local traffic-related parameter by calculating a value taking into account available resources, expressed as Free Bandwidth (FBW), as follows:

$$FBW = \text{(total capacity of a cell } A\text{)} -$$
$$\sum \text{(prob. of handover from cell } k \text{ into cell } A\text{)} *$$
$$\text{(calls in progress in cell } k\text{)} -$$
$$\text{average number of calls received in a time period in}$$
$$\text{cell } A$$

(The symbol "*" is used herein to indicate multiply.)

The summation in the above will generally be over all the neighbouring cells k=1,2,3 . . . . Usually, in known cellular networks for instance of the type provided by Cellnet in the UK, there will be six neighbouring cells. However, in some circumstances the probability of handover to a neighbouring call might be so low that it can effectively be ignored. This might for instance be the case for calls adjacent to the M25 motorway which map onto fields.

To take into account loss of calls from cell A, a further term can be added. This will be a weighted value of the term:

(prob of handout or call termination in a time period)*
(calls in progress)

The actual charge rate set will of course be a function of FBW and could simply be an inverse relationship. However, it is extremely useful to be able to introduce a more complex relationship. This is because there will be coupling between the charge rates notified to users and the take-up rate, or extent to which users then choose to establish calls. Preferably then, the data processing means applies a selected function to FBW to generate the actual charge rates to be output.

Preferably of course, this selected function can be modified, for instance in the light of experience or changing patterns of behaviour.

The above algorithm for FBW can be further modified, as will be described below. Particularly, there may be added a term which prevents FBW rising above a threshold, the threshold being controlled by the neighbouring cell with the worst relationship between available capacity and probability of receiving handover from cell A.

Although the charge rate might be for a unit of connection time, it could be set in different ways. The charge rate is simply for a communications resource. It could alternatively be for instance for a unit of bandwidth, or number of bits transmitted in a variable bit rate service.

Embodiments of the present invention provide a practical, substantially real-time, control mechanism which not only controls the network charging mechanism but can be used by the network infrastructure provider to influence demand such that it is better optimised across the network rather than simply in relation to a single cell of the mobile network. The demand is influenced by supplying the price information to the customer in advance of the customer deciding to make a call. They may decide to wait until they reach a cell where the price is lower. This optimises demand because the cheaper calls will be those with more available capacity. It would also be possible to advise the customer of locations where the price will be lower and so directly encourage them to wait, or indeed to decide to move to such a location.

Another advantage of embodiments of the present invention is that, because the available capacity of adjacent cells is taken into account, the customer can be effectively forewarned of call blocking if an adjacent cell is fully loaded. If only the customer's current cell is taken into account when a call is first established, the call may later be blocked on handover to a neighbouring cell. Embodiments of the present invention can reduce the occurrence of that happening, at least between a neighbouring pair of cells.

BRIEF DESCRIPTION OF THE DRAWINGS

Embodiments of the present invention will now be described, by way of example only, with reference to the following Figures in which:

FIG. 9 shows a schematic network architecture with a charge control system according to an embodiment of the present invention; and FIGS. 10, 11 and 12 show flow diagrams of steps in use of a charge control system as shown in FIG. 9.

(FIGS. 3, 5, 6, 7 and 8 may show an extra, inadvertent vertical line. This is clearly not intended to be part of any of the Figures involved and should be ignored.)

DETAILED DESCRIPTION OF EXEMPLARY EMBODIMENTS

Figure 1:
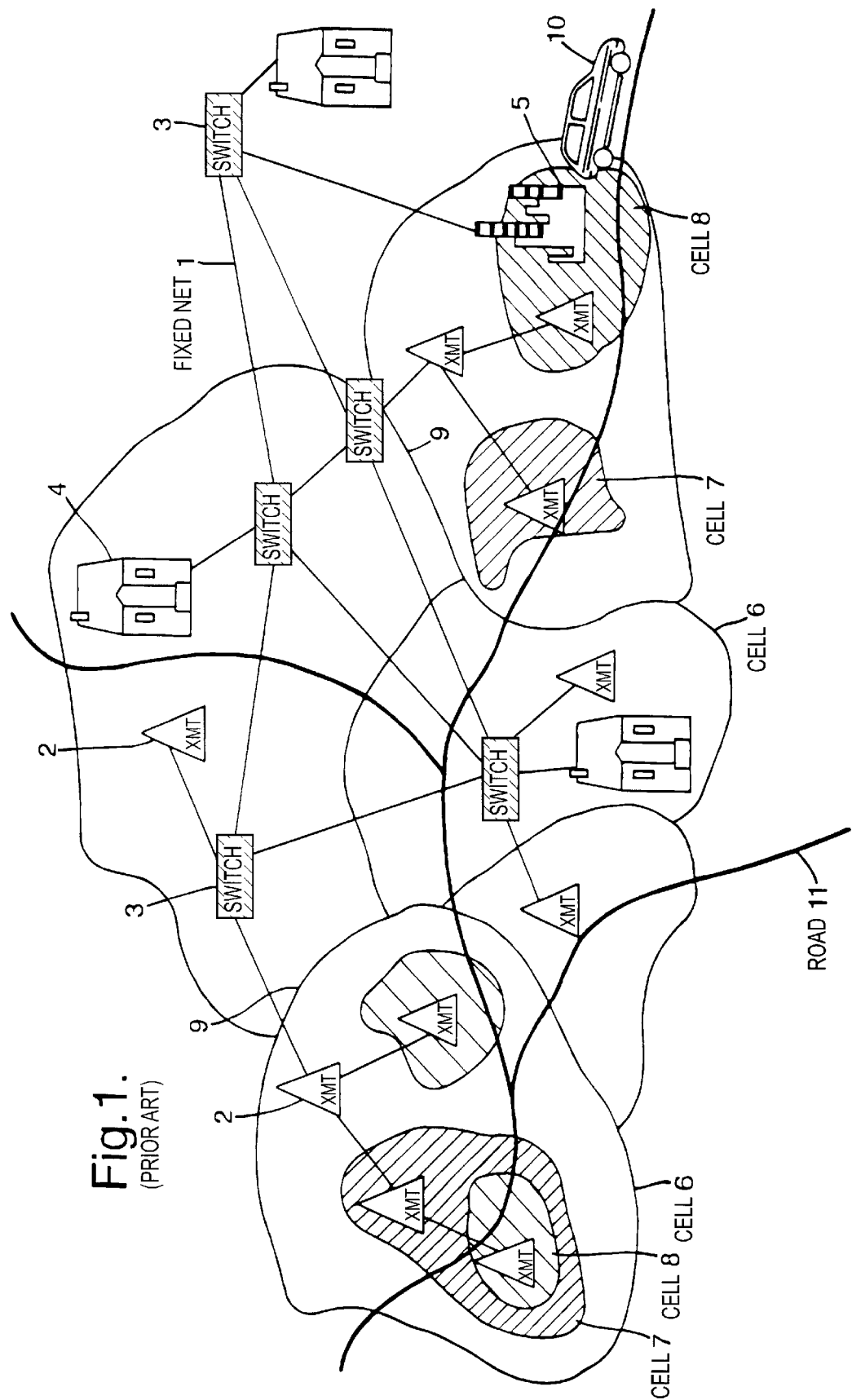
FIG. 1 shows schematically a cellular network infrastructure layout to which embodiments of the present invention will be relevant.

Referring to FIG. 1, a cellular communications network is so called because communications are provided to a mobile user 10 from transmitters 2 which are distributed over the space through which the user might move, for instance by road 11. Each transmitter effectively creates a cell 6, 7, 8, within which the user 10 will receive communications from that one transmitter 2. As the user 10 moves, however, they are likely to move towards a different transmitter 2 until, at some point, the signal from the different transmitter becomes stronger than that from the original transmitter 2. At this point, the user 10 moves effectively into a different cell 6, 7, 8, now served by the different transmitter 2 instead of the original transmitter. This is known as "handover".

The transmitter 2 may provide the whole communication path between a user 10 and a far end connection point. However, for long distance traffic, the transmitter 2 is more likely to provide only a link from the mobile user 10 to a fixed communications network 1, such as the Public Switched Telecommunications Network.

The fixed (broadband) network 1 is the main carrier of long distance traffic and is represented for the purposes of this example to consist solely of Digital Main Switching Units (DMSUs) 3 which are nearly fully interconnected. Houses 4, offices 5 and other buildings etc. are assumed to be connected in known manner to an appropriate node of the fixed network 1.

Where a mobile network is connected to a fixed network 1, it is usually the case that both networks will have their own billing and charging system. The operator of a mobile network leases capacity from the fixed network 1 for carrying the long distance section of connections between mobile users. The operator of the fixed network 1 will issue bills for the leased lines to the operator of the mobile network in the same way as for any other leased capacity customer. Traffic which terminates in the fixed network on the other hand, will be monitored and billed according to the agreement between the two network operators.

In known cellular networks, there are provided large (~10 km diameter) macro cells 6 and smaller (~500 m diameter) micro cells 7. The former provide country wide coverage but a low bandwidth, the latter service local 'hotspots' with higher bandwidth available. Additional services are available through much higher bandwidth, small pico cells 8—typically only a few meters across. These are assumed to be located in offices 5 and at special location points such as garages, railways stations, motorway service stations, shopping centres etc. (All radio cell transmitters 2 are connected in known manner to their local fixed network node.)

Figure 2:
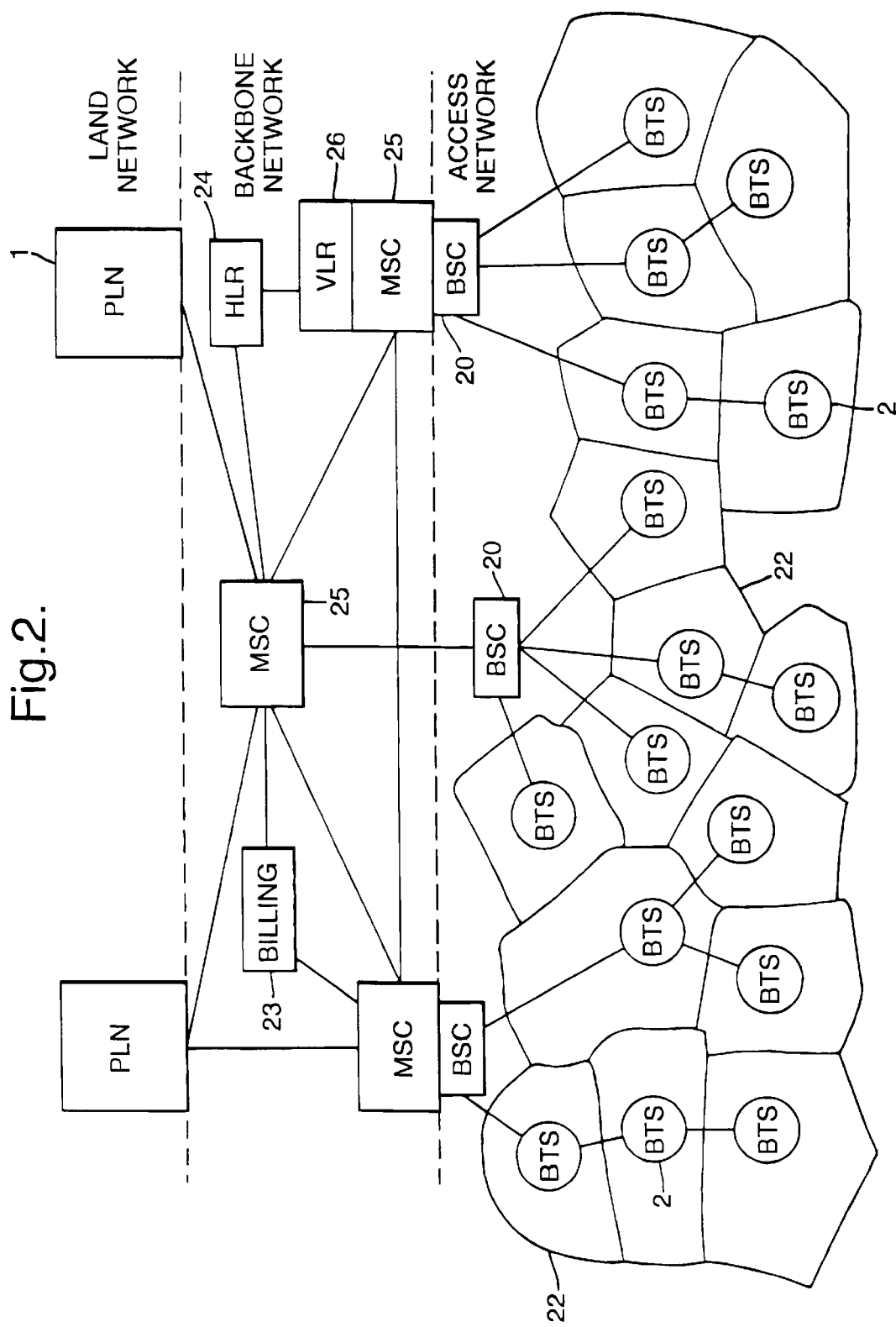
FIG. 2 shows schematically the management structure for cells of a cellular network.

Referring to FIG. 2, (in which the cells 22 are shown in a stylised fashion without showing the different cell sizes) for management purposes the cells are clustered. Although in FIG. 2, the clusters are only of five and six cells, clustering is usually done into groups of seven cells per cluster. Each cell has a base transceiver station 2 and each cluster is managed by a base station controller (BSC) 20. The management structure is hierarchical and above the BSCs sit mobile switching centres (MSCs) 25. (There are approximately half a dozen of these in the Cellnet network for the UK.)

The network has a billing system 23 of known type, accessed by the MSCs 25, and one or more home location registers 24 and visitor location registers 26, also of known type. The home and visitor location registers are used to locate the nearest BSC 20 for an incoming call to a mobile user who could be in any cell 22 of any cluster in the network.

At least some of the MSCs 25 are connected to exchanges (not shown) of a fixed network 1 which carries long distance traffic between mobile users.

Figure 3:
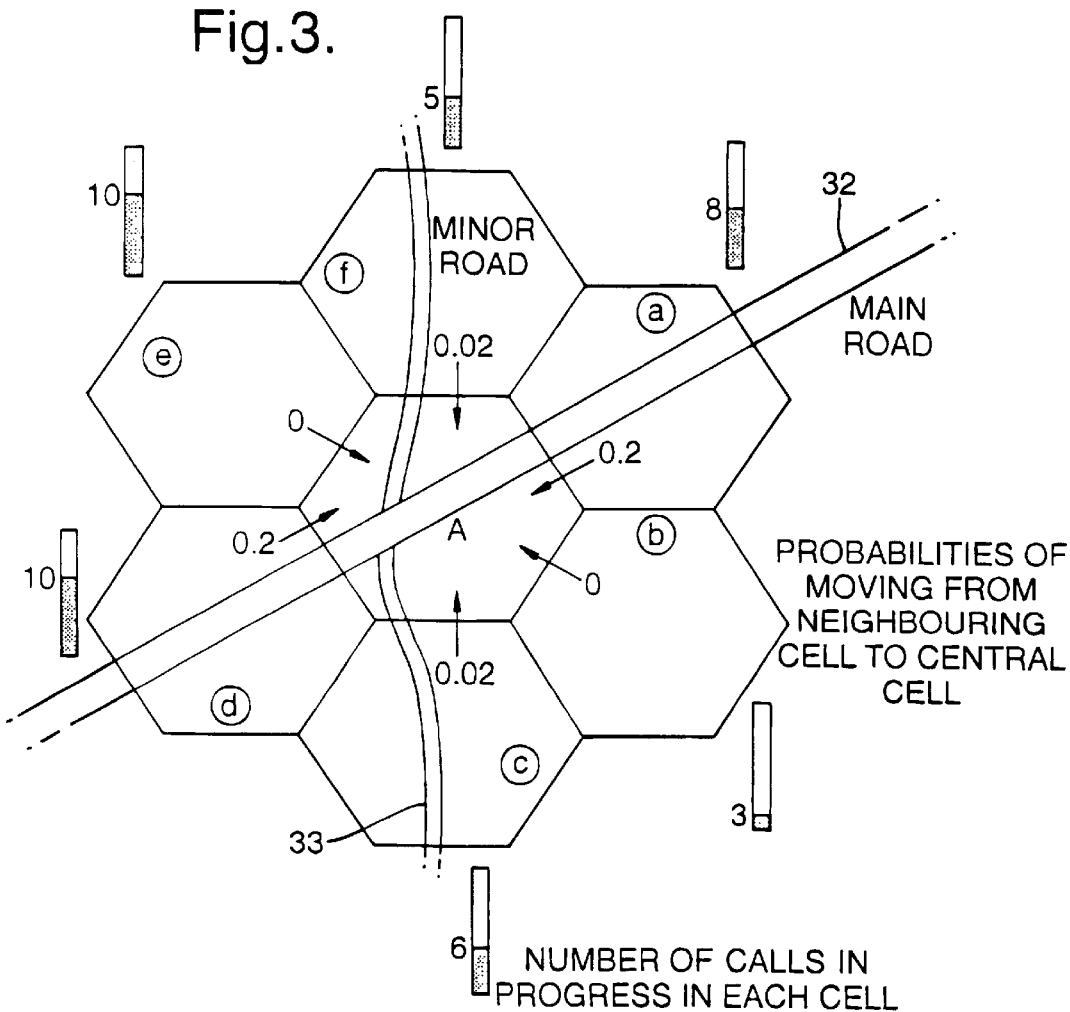
FIG. 3 shows a schematic layout of a particular geographical scenario in which embodiments of the invention might be applied.

Referring to FIG. 3, a specific example of dynamic charging according to an embodiment of the invention might be as follows:

average number of calls received in one time period=2, number of calls in central cell=6 total capacity of each cell=16.

In this specific case a cluster of seven cells 22 occurs at the crossing of a main road 32 and a minor road 33. The associated probabilities of movement from neighbouring cells into the central cell (A) are obtained from the underlying geography or handover information, together with the number of calls in progress in the neighbouring cells.

The number of calls in progress in each neighbouring cell, and the probability of handover to cell A, is as follows:

(a) 8 calls in progress—probability of handover 0.20;

(b) 3 calls in progress—probability of handover 0.00;

(c) 6 calls in progress—probability of handover 0.02;

(d) 10 calls in progress—probability of handover 0.20;

(e) 10 calls in progress—probability of handover 0.00;

(f) 5 calls in progress—probability of handover 0.02.

FBW for the cell of interest, cell A, may be calculated as follows:

$$FBW = \text{total capacity of cell } A -$$

$$\text{calls in progress} -$$

$$\sum (\text{prob of handover from cell } k \text{ to cell } A) *$$

$$(\text{calls in progress in cell } k) -$$

average number of calls received in cell $A$ in a time period.

The summation in the above is over all the neighbouring cells k=(a), (b),(c), (d), (e) and (f). Therefore in this case we have:

$$FBW \text{ in cell } A = 16 - 6 - (8*0.2 + 3*0 + 6*0.02 + 10*0.2 +$$

$$10*0 + 5*0.02) - 2$$

$$= 4.18$$

Figure 4:
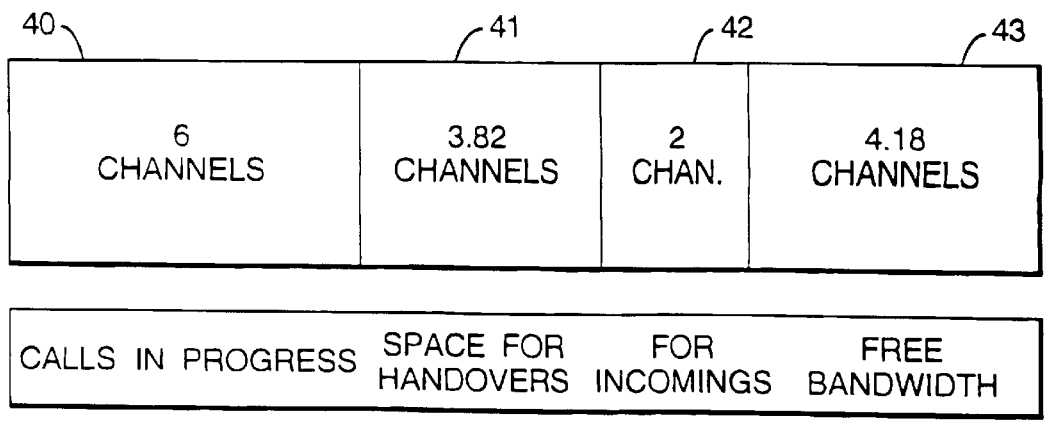
FIG. 4 shows an instance of bandwidth allocation in use of an embodiment of the invention.

Hence the bandwidth is allocated as shown in FIG. 4. That is:

| | |
|---|---|
| 6 channels 40 | to calls in progress |
| 3.82 channels 41 | to space for handovers |
| 2 channels 42 | to incomings |
| 4.18 channels 43 | to free bandwidth |

(Although this result is a mathematical one, used in price setting, it will be realised that in the "real world" the number of channels allocated would probably actually be an integer. Hence, 4 channels would be allocated to space for handovers and 4 channels would be allocated to free bandwidth.)

The probability of handover from one cell to another can be calculated in different ways. For instance, the expected number of handins from each cell can be calculated in one of three ways:
  (i) store information on the number of handovers between cells, and use the average over a certain time interval for the number of handovers expected;
  (ii) store information on the probability of calls in each cell handing over to each neighbouring cell, then: expected number of handovers=probability of handover*number of calls;
  (iii) use positioning information and speed information to build a list of calls which are likely to result in a handin to the cell of interest. The amount of calls in this list is then the number of expected handins.

Systems such as the satellite based Global Positioning System (GPS) are already known which can provide location information to an accuracy of perhaps a few meters. This is easily sufficient to support at least a list of calls likely to result in a handin to a macrocell 6 or a microcell 7, simply by monitoring position information at selected intervals. Another positioning system is that known as "Datatrak".

In a CDMA system 'soft-handover' can occur, where a call may be received at more than one base station simultaneously. A call that is set up in the soft-handover region could be offered at the price of the strongest signal that it's receiving. Alternatively calls that are managed in the soft handover region could be made more expensive as they are in effect using the resources in more than one cell at the same time.

Note there are potential, additional modifications of the free bandwidth formula. For instance, depending on the time interval between FBW calculations and the variance of handout and call termination values, it may be worth taking into account the loss of calls which were in progress at the beginning of a time period. To do this, there can be added some weighting of the term:
  (prob of handout or call termination in a time period)*
  (calls in progress)

If the time interval between FBW calculations (and therefore price re-evaluations) is long, then by assuming all the calls in progress at the beginning of the time period last for the duration of the time period we are over-constraining the available bandwidth. A similar situation arises if we have a main road for example where the stream of handovers is steady. Generally though the call termination/handover rates will have enough fluctuation and the time period can be made sufficiently small that this term need not be used.

One can also impose the restriction that $$FBW \le \min\left\{ \frac{\text{no of free channels in cell } k}{\text{prob of moving into cell } k} \right\}$$

over neighbouring cells k=1 . . . 6

This prevents setting up more calls in the cell than the cell is likely to be able to hand over. However, this term will not normally be needed where each cell leaves enough space for "hand-ins".

Price is determined from FBW using a cost function. The exact cost function can be refined by considering the consumer response to different prices—this data on how the price affects probability of customers making a call can be stored by the base station and should be updated at regular intervals.

Figure 5:
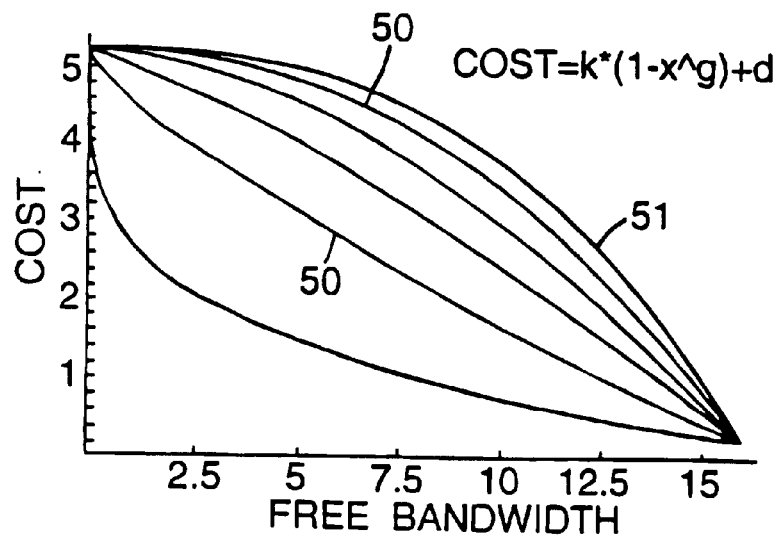
FIG. 5 shows a family of curves which may be applied in setting a charge rate in response to current local traffic loading, in use of an embodiment of the present invention.
Figure 6:
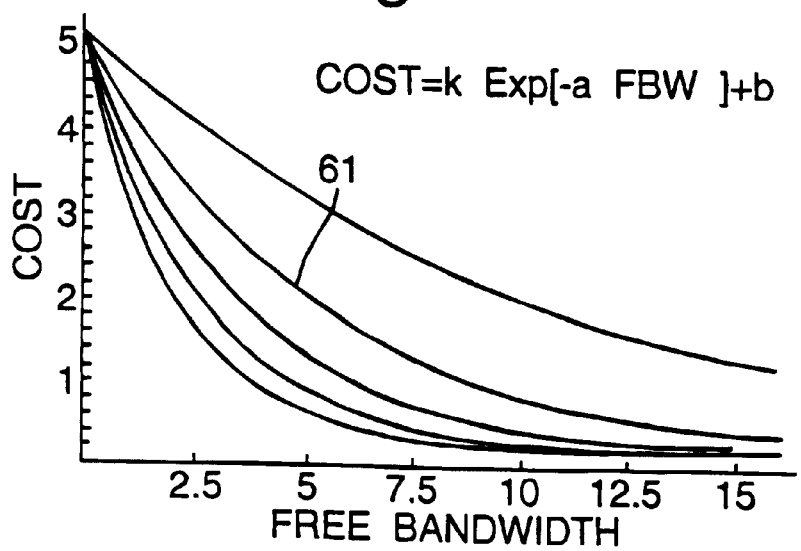
FIG. 6 shows an alternative family of curves to that of FIG. 5.

Although the actual pricing strategy will be determined dynamically according to the consumer response, the range of cost functions could be represented by curves of the forms shown in FIGS. 5 and 6. Referring first to FIG. 5, the cost function could be of the form:

$$\text{cost} = k*(1-X^g) + C1$$

where: X is FBW;
  C1 is the cost of the cheapest call, when the free bandwidth is the total number of channels because there are no calls in progress in the cell or its neighbours and no incoming calls are expected;
  g is a parameter to set the shape of the curve, the different curves 50 of FIG. 5 having different "g" values; and
  "k+C1" is the maximum cost of initiating a call, when the free bandwidth tends to zero.

Referring to FIG. 6, alternatively the cost function could be exponential, having the general expression:

$$\text{cost} = k \exp(-a\, FBW) + b$$

where: b is the charge for a call as FBW tends to infinity;
  k+b is the maximum cost of initiating a call, as in the "k+C1" expression above; and
  a determines the shape of the curve.

In the case of "b", it might be noted that even at 16 free channels, the cost approximates to "b". Putting in the values:

$$\text{cost} = k \exp(-16\, a) + b$$

Figures 7, 8:
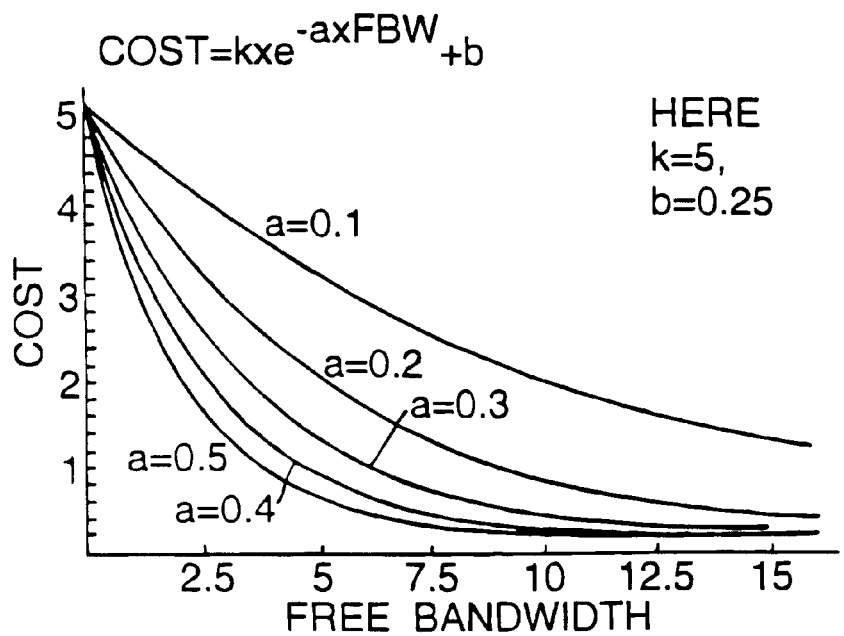
FIGS. 7 and 8 show the values used to generate families of curves according to those of FIGS. 5 and 6.

Referring to FIGS. 7 and 8, the values used to generate a family of curves according to those of FIGS. 5 and 6 can be seen.

In FIG. 7, "k" and "C1" (expressed as "d" in FIG. 7) are given the values 5 and 0.25 respectively. The family of curves is shown for values of "g" from 0.25 to 2.75.

In FIG. 8, "k" and "b" are given the values 5 and 0.25 respectively. The family of curves is shown for values of "a" from 0.1 to 0.5.

The cost is chosen so that in conjunction with the consumer response values one would expect a certain proportion of the free bandwidth to be used in initiating calls in that time step. The actual proportion would be a compromise between maximising use of bandwidth and damping oscillatory effects induced by the pricing.

The function used to derive cost from available bandwidth can of course be selected to suit the circumstances. The shape of the uppermost curve 51 in FIG. 5 may for instance be found to have a buffering effect as available bandwidth gets low because the cost rises early as the available bandwidth goes down and will start to inhibit users from establishing new connections while there is still significant bandwidth remaining.

Suppose in the specific case outlined above, where the free bandwidth in Cell A is 4.18, we have the selected cost curve 61 of FIG. 6, then the corresponding price offered to users wanting to initiate calls in the central cell is 2 units.

The cost formulae above work from the free capacity in a current cell for a user, modified by the amount of incoming traffic which might be expected from neighbouring cells and from new calls originating. It is possible to use a formula which starts instead with the free capacity the current cell but modified by the expectation of the user moving into a cell with different available capacity. This might be formulated as follows.

The pricing information is based on a charge rate for the user's circumstances, depending on the free capacity in the current cell, weighted in relation to free capacity in adjacent cells. The cost of a connection set up based on that charge rate will then equal the length the connection is in place, times the charge rate selected (just as in the previous examples).

This can be set out arithmetically as follows:

$$P = C + F(Co) + \sum_{n=1}^{6} Wn * F(Cn)$$

where $P$ = Price per unit time $C$ = Basic cell change $F(Co)$ = function "$F$" of free capacity in current cell $Wn * F(Cn)$ = weighting factor for adjacent cell $n$ multiplied by a function of the free capacity in adjacent cell $n$ of the free capacity in adjacent cell n The cost of a connection established at time T1 and disconnected at time T2, for the customer, will then be P×(T2−T1).

The basic cell charge, "C", might be fixed for all cells of a network, and might indeed be the same for all the cells. However, it might also be controlled to modify price information in a global manner, for instance, it might be raised at times of peak traffic in a network. Hence "C" can be used to influence traffic in accordance with global factors rather than factors local to a single cell and its immediate neighbours.

The function of the free capacity in the current cell, F (Co), will be selected by the network operator to influence demand appropriately. It will of course normally be an inverse or negative function, so that "P" increases as free capacity decreases.

The functions of the free capacities in the neighbouring cells, "F (Cn)", may in practice repeat the same functions as for the current cell, but each neighbouring cell is also allocated a weighting factor "Wn" selected according to the probability that the customer will move into that cell during progress of a connection.

In the above it has been assumed that there are 6 cells adjacent to the current cell, each having a weighting factor. It is possible to take into account probability of call handover to only selected adjacent cells, for instance one or two particular adjacent cells. For instance, should the user be travelling on the M25 motorway, call handover is extremely likely to only two adjacent cells. Therefore the price will be determined in practice by the basic charge of the current cell, a function of its free capacity and the weighted functions of only two of the adjacent cells.

The weighting factors can of course be selected in any appropriate manner. However, it may be particularly useful to use historical demand data to assign weighting factors which will reflect accurately the probability of a customer moving in a particular direction, and therefore the probability of each neighbouring cell receiving handover. This will of course be time-related.

It is possible to use the weighting factors to reserve capacity in a neighbouring cell. This is possible because a high weighting factor will indicate high probability of handover. Hence, it would be possible to set a threshold for the weighting factors, above which capacity is automatically reserved in the relevant neighbouring cell.

In the equation for "P" given above, there is no weighting factors given for the function of free capacity in the current cell, "F (Co)". There is no reason a weighting factor, "Wo", should not also be used for the current cell, and indeed this provides move flexibility in the algorithm.

The charging information could be quantised in time to simplify the billing information. For example the charge is set for the next 1 minute. All calls set up, say between 12:00 and 12:01 are charged at fixed price. Then there may be a different price for calls set up between 12:02 and 12:03. This would apply across a cell, a cluster of cells or a group of cells such as those controlled by a Mobile Switching Centre (MSC). In general each cell would have its charge rate banded, say 1 p to 100 p or 100 charge bands. There may alternatively be no upper limit set so as to allow for inflation.

As described above, the charge rate is obviously applicable to cost per unit time of single channel calls. However, the network is likely to be able to provide multi-channel connections such as concatenated time slots or multiple access codes. These could be charged at a multiple of the single channel rate, which multiple may or may not be an integer. Because the management of connections using multiple channels is likely to incur lower efficiency, it may be reasonable to charge a premium for such connections. That is, reserving a multi-channel connection and estimating the impact on traffic is likely to be clumsier than carrying out the same operations for users with single channel connections.

For multiple channel calls, it is possible that the number of channels may change while the call is in progress. This change may be initiated by the network due to congestion or difficulty of handover, or it may be initiated by the user wanting a change in provided bandwidth. It is possible to record the total number of channels used throughout the duration of a call, and charge the user accordingly. For user-initiated bandwidth changes, there may be limitations, such as not allowing a bandwidth great enough actually to affect the charge rate.

Dynamic charging could also be used in a packet-switched network where the user sends a varying rate of information. Using Asynchronous Transfer Mode (ATM) terminology, the cost to the user would be equivalent to the cost of the "effective bandwidth". This takes into account average required data rate and variability and ensures certain quality of service parameters are satisfied over all calls. In the same way as in multiple channel allocations, the value of the effective bandwidth will relate to some multiple of the cost value.

In ATM, although it would not be possible to predict the rate at which the user would send information, the charging information provided to them, for instance for a single channel, would still provide an indicator of relative cost to the user for that particular cell and current traffic load.

Dynamic charging could also be used for assymetric services, where the uplink and downlink data rates do not need to be the same. An example of this could be using the WorldWide Web from a mobile computer. Most of the data transfer is downlink, that is from the base station to the mobile computer. In dynamic charging, it would be possible to charge for the total number of channels used, regardless of whether they are uplink or downlink. Alternatively, the two directions could be charged at different rates, depending on the relative number of channels.

Price information can be supplied to customers by known means, such as via Simple Message Service (SMS) in GSM or D channel in ISDN.

Installation Architecture

The arithmetic calculation of the price per unit time, "p", which will be notified to the mobile customer, can be done by any convenient means. Nowadays however it will usually be embodied in software and will sit in relation to the network at a point where it can receive information on free capacity in the cells of the network, or at least in the cell where a call attempt is to be made, and in its neighbouring cells.

The dynamic pricing regime described requires that a cell be aware of the traffic loading in its neighbouring cells. As most cellular networks are hierarchical in their management structure, as is the structure shown in FIG. 2, it will be better that the pricing application is distributed through the network so that when a boundary between areas controlled by lower level nodes is encountered the request for information is passed to a higher level node responsible for a larger area.

Alternatively the network could be designed so that these boundaries are aligned to hard geographical boundaries or even that discreet dynamic pricing environments are located through the network in areas of high demand.

Referring to FIGS. 2 and 9, in a network with a management infrastructure in which clusters of base transceiver stations (BTS) 2 are managed by a base station controller (BSC) 20, pricing within the cluster could obviously be managed by the BSC 20. This is therefore where a charge control system 91 for use in embodiments of the present invention might sit. At the boundaries of clusters, the pricing process could be carried out by referring up to the mobile switching centre (MSC) 25, or by linkage 97 between the BSCs 20. Similarly at MSC boundaries, linkage 98 between MSCs 25 allows the exchange of information such as traffic or price information.

Once a charge rate has been calculated and set for a user connection, in a transaction involving a call record it will be output to a billing system 23 of known type for logging in the appropriate call record. Billing systems 23 in known cellular networks are usually interfaced at the MSC level.

Referring to FIG. 9, the lowest level in a cellular network that usually has the necessary traffic flow data to provide to a charge control system 91 is at the base station controller 20. This is a small switch with reasonable computing power that controls frequency allocation and handovers between base transceiver stations 2 under its control. It is the point of control of the radio interface and consequently would be a good point at which to store historical handover data to produce time variant data to feed into the price information.

Other suitable points where the software might sit, or at least obtain the necessary information, might of course be different for different networks, and for different network operators or for different equipment manufacturers. However, networks will generally be provided with traffic monitoring capability at the cell level since it is important for planning network capacity updates. Embodiments of the present invention simply exploit that existing traffic monitoring capability.

The charge control system 91 itself comprises monitoring means 92 for monitoring traffic in the cells of its cluster, a data processor 94 for generating a charge rate on the basis of current and historic traffic data, data stores 95, 96 for holding the current and historic traffic data, and charge setting means 93 for outputting a charge rate generated by the data processor 94. The charge rate may be output just to the user(s) or to the user(s) and to a billing system 23, depending on the charging mechanism to be applied.

Charge control systems 91 may be connected at the BSC level and at the MSC level in the network, as shown, or may reside at only the MSC level, the charge control system residing at the BSC level for instance being replaced simply by monitoring means 92.

When a user in a cell 22 wants to set up a connection in the mobile network, he/she puts their mobile telephone set in the off-hook condition. This sends a signal, using a common control channel, to the base station controller 20 for the relevant cell cluster. Normally, the base station controller 20 would then assign a vacant channel (for instance a frequency or a time slot) from the BTS 2 to the mobile handset and subsequently establish an appropriate connection to the call destination. This includes the triggering of a toll ticket for the duration of the call, which toll ticket is subsequently stored at the home or visitor location registers 24, 26 for subsequent use in billing the customer.

In embodiments of the present invention, the signalling in the control channel prior to call set up may also trigger the delivery of price information to the user. This price information is provided by the charge control system 91 and may be delivered to the user by means of the common control channel. A connection is not then set up to the call destination until the user has confirmed that they wish to go ahead. Alternatively, the price information might be delivered to the user by means of the channel assigned by the BSC 20. As mentioned above, communication at this stage can be made by any convenient means which the control or assigned channel can carry and may for instance be compatible with a relevant control signal format, or be by Simple Message Service or by the D channel in ISDN.

The base station controller alerts the charge control system 91 when it receives the initial contact via a control channel from the user. The charge control system 91 runs an application at the data processor 94 to determine the current charge rate for the cell 22 where the user is located. The application applies the selected algorithm(s) to calculate the FBW (as described above) and applies a selected cost function to arrive at a price for the user. The data the algorithm and cost function are applied to is taken from two locations in the data store 95, 96. One of these stores current traffic data and the other stores historic traffic data for the cell, which will usually incorporate a time dependent factor such as time of day. The charge control system 91 will also therefore require time information in order to apply the historic traffic data correctly. Preferably, it will obtain this information from a centralised source in the network, to avoid discrepancies arising between cell clusters or geographical areas.

The charge control system 91 will now output a unit price which the BSC 20 sends to the user. If the user decides to go ahead at that price, the charge control system 91 is triggered to send the unit price data to the home or visitor location register 24, 26 for the user, where it is captured in a field of the toll ticket for the connection, for subsequent use in billing the user.

(As decribed above, the user may pay directly in some manner for the call and the use of the toll ticket field as described is optional. However, the charge control system 91 will output the unit price then directly to the appropriate charging mechanism.)

As can be seen in FIG. 9, information flow in respect of delivering pricing information as described needs to be at least partially two-way. There will be information delivered upwards by the base transmitter stations 2 concerning traffic loading and mobility information. Generally, information passed up from the BSCs 20 to the MSCs 25 will be information relevant to the network as a whole. Information passing downwards will generally be charging information for the user.

There also needs to be some information transmission between elements at the same level in the network. This will occur for instance where the user is located in a cell at the edge of a cluster. Data for more than one cluster will then be necessary before a charge control system has sufficient information on which to base a charge calculation. BSCs 20 and/or MSCs 25 will then have to exchange current traffic load and historic information amongst themselves.

Embodiments of the invention could be used for non-real time services such as E-mail while voice telephony is maintained at a fixed rate. This is because users may not care greatly when non-real time services are delivered and this could take place in period of low demand on the network or when people move into cells with free capacity.

A system such as MONDEX could be used to collect payment. Therefore no bills would have to be produced. Billing information could be collected on the mobile user's equipment and/or in the network.

Referring to FIG. 10, together with FIGS. 2 and 9, a flow chart setting out steps in operation of a system according to a "centralised" embodiment of the present invention, in which the full charge control system 91 sits only at the MSC level in the network, is as follows:

Step 100:
Monitoring means 92 for each BSC 20 monitors substantially real time traffic information for each cell 22 provided by the relevant BTSs 2 at regular time intervals, say 15 seconds;

Step 105:
Monitoring means 92 for each MSC 25 monitors substantially real time traffic information for each cell cluster, provided via the relevant BSCs 20 at said regular time intervals;

Step 110:
The traffic information provided by the monitoring means of the BSCs 20 and the MSCs 25 is transmitted to the current traffic data store 95 of the charge control system; 91 of the MSC 25;

Step 115:
The transmitted traffic information is stored by the current traffic data store 95 of the MSC 25 as a rate per time interval;

Step 120:
The data processor 94 of the charge control system 91 of the MSC 25 takes inputs from its associated current and historic traffic data stores 95, 96 and sorts the data to assess where data pertaining to any cell is missing with regard to each of its neighbours. Where necessary, the data processor 94 will trigger a request for current and historic traffic data from a neighbouring MSC 25 to deal with cells at the edge of clusters which themselves lie at the edge of the region the subject MSC 25 has direct data for;

Step 125:
The data processor 94 calculates a charge rate per cell 22, according to an algorithm for assessing FBW such as described above, together with a cost function, again such as described above;

Step 130:
The charge setting means 93 outputs a charge rate for each cell 22 to two locations, these being to the BSC 20 for any current user (that is, a user with their mobile equipment switched on), and to the home and/or visitor location register 24, 26 for any current user;

Step 135:
Each BSC 20 receiving the charge rate transmits the information to each current user via their BTS 2 and an appropriate channel, such as via a common control channel or via a dedicated time slot in their signalling channel for example. The charge rate will be notified to any user who has not already established a connection channel. (It may optionally also be notified, for instance via a display panel on their equipment, to a user who has already established a connection channel but it will not affect the charge rate of any call in progress except under exceptional circumstances predetermined by the network or service operator and agreed with the user beforehand); and Step 140:
The home and/or location registers 24, 26 receiving the charge rate information store the information.

The reason that a user who has already established a connection channel does not suffer a change in charge rate, although the home and/or visiting location registers store an updated charge rate, may be because the charge rate for a connection is established at call set up, using the charge rate information stored at the home and/or visiting location register at that time. That is, the call record is given that charge rate information and is not subsequently updated.

If call charges are to be applied differently, for instance by deducting MONDEX credit in real time, or the like, it may be necessary for the charge control system 91 to put a positive bar on changing charge rate information at the home and/or visiting location register for users where a connection is already in progress. However, this is relatively easy for the MSC 25 to control since the MSC 25 will have the relevant real time traffic data, as stored in its data store 95, such that it can send only update data for current users without connections in progress. Alternatively, this could be done at BSC 20 level, or indeed at the home and/or visitor location register itself.

Referring to FIGS. 11 and 12, together with FIGS. 2 and 9, the equivalent flow chart to that above, but for the less centralised embodiment of the invention shown in FIG. 9 in which there is a charge control system 91 at each BSC 20 as well as at each MSC 25, is as above:

Step 1100:
Monitoring means 92 for each BSC 20 monitors substantially real time traffic information for each cell 22 provided by the relevant BTSs 2 at regular time intervals, say 15 seconds;

Step 1105:
Monitoring means 92 for each MSC 25 monitors substantially real time traffic information for each cell cluster, provided via the relevant BSCs 20 at said regular time intervals;
Step 1110:
The traffic information provided by the monitoring means of the BSCs 20 and the MSCs 25 is transmitted to the current traffic data stores 95 of the charge control systems 91 of the MSC 25 and the neighbour BSCs 20 where their monitoring means 92 monitor the relevant traffic;
Step 1115:
The traffic information is stored in the current traffic data stores 95 for said MSC 25 and BSCs 20;
Step 1120:
The charge control system 91 of the MSC 25 signals any neighbouring MSC 25 to which the current traffic data will be relevant, and the neighbouring MSC 25 stores it in the current traffic data store 95 of its charge control system 91;
Step 1125:
The data processors 94 of the charge control systems 91 of the MSC 25 and the BSCs 20 take inputs from their associated current and historic traffic data stores 95, 96. If data for any cells is missing, because data for neighbouring cells is held by a neighbouring BSC 20 or MSC 25, then the data processors 94 poll the appropriate BSC 20 or MSC 25 to complete their data sets as needs be;
STEP 1130:
The data processors 94 calculate a charge rate per cell 22, according to an algorithm for assessing FBW such as described above, together with a cost function, again such as described above;
Step 1135:
The charge setting means 93 of the BSCs 20 output a charge rate for each cell 22 to the home and/or visitor location register 24, 26;
Step 1140:
If there is already a call (connection) in progress, then there is no change at the home and/or visitor location register 24, 26 for the relevant user but otherwise the charge rate is stored; and
Step 1145:
The charge setting means 93 of each BSC 20 transmits the information to each current user via their BTS 2 and an appropriate channel, such as via a common control channel or via a dedicated time slot in their signalling channel for example. The charge rate will be notified to any user who has not already established a connection channel. (It may again optionally also be notified, for instance via a display panel on their equipment, to a user who has already established a connection channel but it will not affect the charge rate of any call in progress except under exceptional circumstances predetermined by the network or service operator and agreed with the user beforehand).

The second system described above involves more duplication of processing capacity but there is less transfer of data on the network and there will be more resilience in the case that data is lost.

It may be preferred in the second system that the charge control system 91 for each MSC 25 only calculates a charge rate for cells at the edge of clusters which in turn are at the edge of the area for the relevant MSC 25. This would reduce the total processing capacity provided.

In an alternative system, the processing capacity need only be provided at the level of the BSCs 20. Where information for neighbouring cells is missing for a particular BSC 20, it can in most circumstances get the information directly from the relevant neighbouring BSC 20.

It will clearly be important to be able to update the historic traffic data since use patterns will change over time. This can be done by using the current traffic data and monitoring it over significant periods. For instance, the daily traffic pattern can be monitored over a period of six months, in a weekly cycle. If there is a significant change over that period, then the historic traffic data being used can be updated. This provides a learning mechanism for the system.

A time interval of fifteen seconds is mentioned above as the repetition rate for monitoring current traffic data. This is not mandatory but is merely selected as a time interval which gives the user a reasonable time in which to make a decision over whether to establish a connection. In practice, it may be preferred to reduce the time interval and update the user more frequently, or to increase the time interval and so reduce processing load and network capacity used in transferring data.

Data may be transmitted to users individually, rather than by a broadcast mechanism, to reduce network traffic. This also allows the data to be tailored to each user, e.g. providing customised information.

What is claimed is:

1. A charge control system for use in a cellular communications network infrastructure, wherein local charges are modifiable in response to current local traffic loading, the system comprising:

i) monitoring means to monitor current local traffic loading in the network;

ii) a data store to store historic traffic data related to cells of the network;

iii) data processing means arranged in operation to generate a local traffic-related parameter, dependent at least in part on the current traffic loading in a local area of the network and the historic traffic data pertaining to that local area; and iv) charge setting means arranged in operation to set the rate at which traffic is charged by the network in said local area thereof, the rate set by the charge setting means being controlled at least in part by said local traffic-related parameter.

2. A system according to claim 1, wherein the charge setting means comprises a data store, or access to a data store, in which is loaded an updatable algorithm for applying to the local traffic-related parameter to generate the charge rate set by the charge-setting means.

3. A system according to claim 1, wherein the network is at least in part a mobile network and the historic traffic data comprises, at least in part, handover data, relating to historic handover patterns between cells of the network.

4. A system according to claim 1 wherein the monitoring means is arranged in operation to monitor current local traffic loading in respect of cell clusters, each cell cluster comprising a central cell together with the neighbouring cells from which the central cell would receive handover, the monitoring means, in operation, storing or outputting data sets, each data set relating to the cells of one cell cluster.

5. A system according to claim 1, further comprising means to output the rate set by the charge setting means to user equipment connected to the network.

6. A system according to claim 1, wherein the network is provided with an area-based management infrastructure, comprising base station controllers for controlling handover between cells of each cluster, the monitoring means being provided by the base station controllers.

7. A system according to claim 1, further comprising means to update the charge rate set by the system at regular intervals, and means to maintain a single charge rate applied by a billing system to any chargeable connection already established in the network before the end of one of said intervals.

8. A system according to claim 7 wherein the means to maintain a single charge rate comprises means for setting a charge rate field in a call record for the chargeable connection, which means is triggered by connection set-up.

9. A system according to claim 1, wherein the monitoring means has an output to the data store for historic traffic data and the historic traffic data is periodically refreshed such that the system has a learning, or adaptive, capacity.

10. A system as in claim 1 further comprising:

means to update the charge rate set by the system at regular intervals.

11. A system as in claim 10 further comprising:

means to maintain a single charge rate applied by a billing system to any chargeable connection already established in the network before the end of one of said intervals.

12. A method for use in a cellular communications network infrastructure, wherein local charges are modifiable in response to current local traffic loading, the method comprising the steps of:

i) monitoring current local traffic loading in the network;

ii) generating a local traffic-related parameter, dependent at least in part on the current traffic loading in a local area of the network and historic traffic data pertaining to that local area; and iii) determining the rate at which traffic is charged by the network in said local area thereof, the rate set by the charge setting means being controlled at least in part by said local traffic-related parameter.

13. A charge control method for use in a cellular communications network infrastructure, wherein local charges are modifiable in response to current local traffic loading, the method comprising:

i) monitoring current local traffic loading in the network;

ii) maintaining historic traffic data related to cells of the network;

iii) generating a local traffic-related parameter, dependent at least in part on the current traffic loading in a local area of the network and the historic traffic data pertaining to that local area; and iv) setting the rate at which traffic is charged by the network in said local area controlled at least in part by said local traffic-related parameter.

14. A method as in claim 13 wherein the setting step comprises accessing a data store, in which is loaded an updatable algorithm for applying to the local traffic-related parameter to generate the charge rate set.

15. A method as in claim 13 wherein the network is at least in part a mobile network and the historic traffic data comprises, at least in part, handover data, relating network to historic handover patterns between cells of the network.

16. A method as in claim 13 wherein the monitoring step monitors current local traffic loading in respect of cell clusters, each cell cluster comprising a central cell together with the neighboring cells from which the central cell would receive handover, the monitoring step storing or outputting data sets, each data set relating to the cells of one cell cluster.

17. A method as in claim 13, further comprising outputting the rate set by setting step to user equipment connected to the network.

18. A method as in claim 13 wherein the network is provided with an area-based management infrastructure, comprising base station controllers controlling handover between cells of each cluster, the monitoring step being performed by the base station controllers.

19. A method as in claim 13 further comprising updating the charge rate set at regular intervals, and maintaining a single charge rate to any chargeable connection already established in the network before the end of one of said intervals.

20. A method as in claim 19 wherein the maintaining step comprises setting a charge rate field in a call record for the chargeable connection which is triggered by connection set-up.

21. A method as in claim 13 wherein the monitoring step outputs historic traffic data to a data store that is periodically refreshed such that the system has a learning, or adaptive, capacity.

22. A method as in claim 13 further comprising:

updating the charge rate set at regular intervals.

23. A method as in claim 22 further comprising:

maintaining a single charge rate to any chargeable connection already established in the network before the end of one of said intervals.

24. A method of charging for use of a cellular communications system, said method comprising:

maintaining historic data representing past use patterns of cells in the system;

measuring current use of cells in the system; and communicating a current use charge to potential or actual users of the system that is a function of both said historic data and said current use.

* * * * *